United States Patent
Nandy et al.

(10) Patent No.: US 11,424,961 B2
(45) Date of Patent: Aug. 23, 2022

(54) EXPORTING THE DEVICE SHARING ATTRIBUTE FOR HOST DEVICES FROM A WIRELESS CONTROLLER TO A SWITCH

(71) Applicant: Hewlett Packard Enterprise Development LP, Houston, TX (US)

(72) Inventors: Tathagata Nandy, Bangalore (IN); Chethan Chavadibagilu Radhakrishna Bhat, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 748 days.

(21) Appl. No.: 16/132,289

(22) Filed: Sep. 14, 2018

(65) Prior Publication Data

US 2020/0092139 A1    Mar. 19, 2020

(51) Int. Cl.
*H04L 49/201* (2022.01)
*H04L 12/46* (2006.01)
*H04L 12/18* (2006.01)
*H04L 47/80* (2022.01)

(52) U.S. Cl.
CPC ........ *H04L 12/4679* (2013.01); *H04L 12/185* (2013.01); *H04L 12/189* (2013.01); *H04L 47/806* (2013.01); *H04L 49/201* (2013.01)

(58) Field of Classification Search
None
See application file for complete search history.

(56) References Cited

U.S. PATENT DOCUMENTS

| | | | |
|---|---|---|---|
| 6,128,649 A * | 10/2000 | Smith | H04N 7/152 348/14.03 |
| 8,270,395 B2 | 9/2012 | Kompella | |
| 9,479,349 B2 | 10/2016 | Bhagavathiperumal et al. | |
| 2002/0186694 A1* | 12/2002 | Mahajan | H04L 12/4641 370/390 |
| 2003/0105829 A1* | 6/2003 | Hayward | H04L 67/2852 709/214 |
| 2006/0146857 A1* | 7/2006 | Naik | H04L 47/20 370/432 |
| 2006/0182109 A1* | 8/2006 | Meisen | H04L 12/1886 370/390 |
| 2007/0250635 A1* | 10/2007 | Hamilton | H04L 65/80 709/231 |
| 2007/0280236 A1* | 12/2007 | Yang | H04L 12/185 370/390 |
| 2008/0175239 A1* | 7/2008 | Sistanizadeh | H04L 12/18 370/390 |
| 2009/0193481 A1* | 7/2009 | Huang | H04N 21/2221 725/116 |

(Continued)

OTHER PUBLICATIONS

Cisco Unified Wireless Multicast Design, Cisco, Retrieved Jun. 15, 2018, 6 Pgs.

*Primary Examiner* — Edan Orgad
*Assistant Examiner* — Emmanuel K Maglo
(74) *Attorney, Agent, or Firm* — Sheppard Mullin Richter & Hampton LLP (57) ABSTRACT

Methods for directly mapping attributes from controllers connected to a switch are provided. Multicast protocols are combined with policy management and applied to systems with multiple host and source devices. Unnecessary data packets are dropped, while only necessary data packets are forwarded. These methods decrease the amount of resources needed to process requests received during multicasting, provide enhanced security options, and further integrate networking solutions.

20 Claims, 6 Drawing Sheets

(56) References Cited

U.S. PATENT DOCUMENTS

| | | | |
|---|---|---|---|
| 2010/0014519 A1* | 1/2010 | Fernandez | H04L 12/185 370/390 |
| 2010/0046513 A1* | 2/2010 | Park | H04N 7/17345 370/390 |
| 2010/0183008 A1* | 7/2010 | Fernandez | H04L 12/66 370/390 |
| 2011/0010441 A1* | 1/2011 | Gutierrez | H04L 41/046 709/223 |
| 2011/0058551 A1* | 3/2011 | Fernandez | H04L 12/18 370/390 |
| 2011/0231452 A1* | 9/2011 | Nakajima | G06F 3/0605 707/803 |
| 2013/0145284 A1* | 6/2013 | Anantharaman | H04L 63/10 715/753 |
| 2014/0094142 A1* | 4/2014 | Torres | H04W 12/068 455/411 |
| 2014/0211797 A1 | 7/2014 | Luo et al. | |
| 2014/0369251 A1* | 12/2014 | Zhang | H04L 12/1877 370/312 |
| 2016/0080446 A1* | 3/2016 | Karthikeyan | H04L 65/4076 709/219 |
| 2016/0344693 A1* | 11/2016 | Wetterwald | H04L 61/103 |
| 2017/0180249 A1* | 6/2017 | Shen | H04L 41/0893 |
| 2017/0180250 A1* | 6/2017 | Shen | H04L 45/586 |
| 2017/0214719 A1* | 7/2017 | Mohan | H04L 63/101 |
| 2017/0264742 A1* | 9/2017 | Karimli | H04M 3/42263 |
| 2018/0041555 A1 | 2/2018 | Manohar et al. | |
| 2018/0146058 A1* | 5/2018 | Somayazulu | H04L 47/783 |
| 2019/0373028 A1* | 12/2019 | Kasula | G06F 3/0484 |
| 2020/0067818 A1* | 2/2020 | Jeuk | H04L 65/1046 |
| 2021/0084010 A1* | 3/2021 | Alharbi | H04L 63/1416 |

* cited by examiner

| (S,G) REQUEST FROM HOST (H) FOR GROUP (G) | IS SOURCE (S) SHARED WITH HOST (H) AS PER CONTROLLER'S DATABASE? | FORWARD REQUEST/ DO NOT FORWARD REQUEST |
|---|---|---|
| INCLUDE SOURCE (S) | YES | FORWARD REQUEST |
| INCLUDE SOURCE (S) | NO | DO NOT FORWARD REQUEST |
| EXCLUDE SOURCE (S) | YES | DO NOT FORWARD REQUEST |
| EXCLUDE SOURCE (S) | YES | DO NOT FORWARD REQUEST |

EXPORTING THE DEVICE SHARING ATTRIBUTE FOR HOST DEVICES FROM A WIRELESS CONTROLLER TO A SWITCH

DESCRIPTION OF THE RELATED ART

Data networking solutions are increasingly used by enterprises and businesses worldwide to manage and administer computer networks. Within computer networks, the nodes (e.g., personal computers, phones, and servers) share resources with each other. Core products within the data networking solutions include wireless Access Points (APs), wired switches, mobility controllers (e.g., wireless controllers), and network management software. Data networking solutions sold under Aruba Networks™ provide Wi-Fi wireless local area networks (WLAN) under IEEE 802.11 standards.

Some policy based management tools control access and priorities for the use of computing resources (e.g., access to files and applications) in shared devices across wired, wireless, and Virtual Private Network (VPN) infrastructure, based on the roles of end-users and shared devices. For example, WLAN administrators may use management portals to allow or disallow access for the end-users to the resources in the shared devices. WLAN users may use corresponding management portals to register their shared devices, which may facilitate end-user access to the resources in the shared devices.

BRIEF DESCRIPTION OF THE DRAWINGS

The present disclosure, in accordance with one or more various embodiments, is described in detail with reference to the following figures. The drawings are provided for purposes of illustration only, and merely depict typical or example embodiments. These drawings are provided to facilitate the reader's understanding of various embodiments and shall not be considered limiting of the breadth, scope, or applicability of the present disclosure. It should be noted that for clarity and ease of illustration, these drawings are not necessarily made to scale.

The figures are not intended to be exhaustive or to limit various embodiments to the precise form disclosed. It should be understood that various embodiments can be practiced with modification and alteration.

DETAILED DESCRIPTION

Certain device/service sharing mechanisms may be implemented in a network. For example, Apple® devices may use Bonjour® for device/service sharing. Typically, a registration sequence is performed to share devices/services. For example, ClearPass Policy Manager™ (CPPM) is a software tool for providing network access control based on roles and devices for employees, contractors, and guests across any multivendor wired, wireless, and virtual private network (VPN). CPPM contains context-based policy engines; protocol support; device profiling; guest access options via ClearPass Guest (CPG); and registration portals. CPPM portals for WLAN administrators and CPG portals for WLAN users control the visibility and access of a device among other entities. While interested end-users can see devices and services that they want access to, access to these devices and services can be restricted to only intended end-users (i.e., authorized, or registered end-users of a shared device). All shared attributes of the device may be computed and maintained in a wireless controller (WC) which obtains this information from the APs that are terminated to the WC. Policies (e.g., CPPM), which support the authentication of devices, are applied on the WC and cloud-based WCs. The APs within a network are connected to a wired switch. The wired switch may be connected to various devices and services either directly or through APs that terminate to the wired switch. At least one of the devices and services is a source device (S) for multicast internet protocol applications which stream media. It should be understood that multicasting in a WLAN may involve transmitting multicast packets that include a group address used to deliver the same packet to multiple destinations (e.g., devices or nodes). The shared attributes contain information that may not be accessible by the wired switch that is connected to the same network.

Embodiments allow the shared attributes to be extended to policy managers while sharing a multicast stream from a source device (S). More specifically, CPPM and CPG can be used with various shared devices (which may be embodiments of the aforementioned nodes) that implement zero-configuration networking for service discovery, address assignment, and hostname resolution.

Attributes residing across domains may be used within a single policy under CPPM, which applies IEEE 802.11 standards, for authenticating end-user and shared devices. In turn, CPPM can automatically revoke or deny access to computing resources. Various sharing attributes (e.g., a shared end-user list, a shared role list, and location parameters configured for a shared device) influence: (i) the visibility of shared devices; and (ii) the access to the computing resources within the shared devices. More specifically, the shared devices can be registered and made visible to the device owner or to other end-users with whom the device owner has shared the device. The location attribute can be dynamically derived based on where the end-user of the shared device currently resides and to which AP the shared device is currently connected. The shared devices may also be in a set of shared devices, referred to a group of devices (G). The group of devices (G) is a configurable entity where registered shared devices are visible and potentially accessible to other shared devices with whom an owner has shared the device.

Various embodiments are directed to policy and protocol managers connecting a wired switch to a WC to provide the wired switch with sharing attributes of devices connected to the wired switch (directly or indirectly via an AP). A shared device, serving as a host device (H), receives multicast request(s) specifying a source device (S), while facilitating communication between a wired switch and WCs. Source devices (S) and host devices (H) determine whether there is a communication between source devices (S) and the host devices (H), as per attributes in the WCs. Data packets, which are deemed unnecessary requests to facilitate communications between the source devices (S) and host devices (H), are dropped.

Some of the observed advantages attained by providing a wired switch with sharable attributes of devices may include: improving processing efficiency within a network; aligning wireless and wired infrastructure for more efficient exchange of information within a network; and integrating networking systems for limiting the number of devices needed for multicast applications.

In some embodiments, the attributes used for sharing a device are extended to multicast stream sharing. This leads to a single policy for device sharing and multicast stream viewing, where devices can be authenticated to control access to computing resources. When there are multiple source devices (S) for multicast stream(s), the embodiments directly obtain the correct source device (S), based on the sharable attributes from the wireless controller to save a lot of unnecessary data packet flow in the network. Correct source devices (S) refer to devices that allow a host device (H) to access computing resources, such as the multicast transmission. By obtaining the correct source device (S) more instantly, data packets associated with the requests for the correct source devices (S) only pass through and need to be processed. In conventional systems that do not apply the embodiments, all the source devices (S) need to be evaluated to find the correct source device (S).

Figure 1:
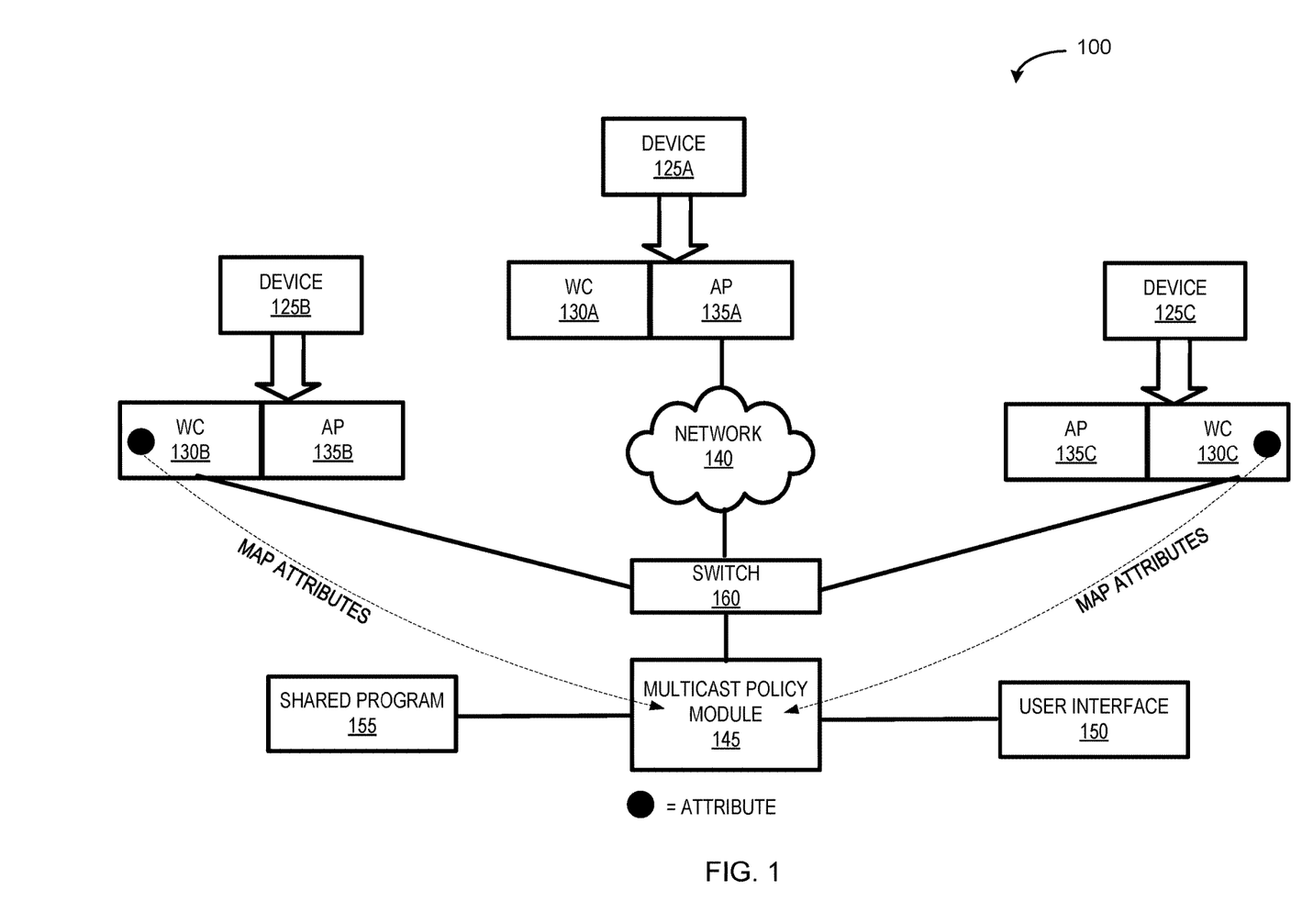
FIG. 1 is a block diagram of an example network system containing a switch connected to the wireless controller, in accordance with various embodiments.

FIG. 1 illustrates one embodiment of a network configuration 100 that may be implemented for a multi-user organization, such as a business, educational institution, governmental entity, or any other organization having multiple users and possibly multiple physical or geographical sites. FIG. 1 is a block diagram of an example network system containing a wired switch connected to the wireless controller. The network configuration 100 may be, for example, one or more server computers; controllers; or any other similar computing components capable of processing data. In the example implementation of FIG. 1, the network configuration 100 includes network 140, WCs 130A-C, access points (AP) 135A-C, and switch 160.

In some embodiments of FIG. 1, the switch 160 is communicatively connected to WC 130B and WC 130C. More specifically, the switch 160 is directly connected to WC 130B and WC 130C to obtain sharing/sharable attributes residing in WC 130B and WC 130C. Additionally, switch 160 is communicatively connected to a multicast policy module 145. In turn, the multicast policy module 145 is communicatively connected to shared program 135 and user interface 150. The direct connection of WC 130B and WC 130C to the multicast policy module 145 maps the attributes to the multicast policy module 145 from the WC 130B and the WC 130C, respectively. Furthermore, the switch 160 connects to the AP 135A via the network 140. Stated another way, the switch 160 does not directly connect to the WC 130A and therefore, the multicast policy module 145 does not directly map the attributes in WC 130A (which are not explicitly depicted in FIG. 1).

In some embodiments, the multicast policy module 145 combines policies with multicast protocols to directly obtain/extract attributes from controllers (e.g., WC 130B and WC 130C). The policies, which may be CPPM or internally computed by controllers (e.g., WC 130B and WC 130C), are applied to attributes (e.g., location attributes) in the controllers (e.g., WC 130B and WC 130C). In some embodiments, the switch 160 runs multicast protocols from a source device (S) among devices 125A-C. By copying transmission from a source device (S) among a group of shared devices (G), the multicast protocol may be streamed as group communication as a one-to-many or many-to-many distribution. In some embodiments, the multicast policy module 145 implements a network-assisted multicast at a data link layer (not depicted in FIG. 1) using one-to-many addressing and switching, such as Ethernet multicast addressing, Asynchronous Transfer Mode (ATM), or Infini-Band multicast. Without the multicast policy module 145, a policy is not guaranteed to be enforced in a wireless controller, and switch 160 may not follow the policy. Stated another way, shared devices not authorized to access a multicast protocol may be able to access the multicast protocol by virtue of the switch 160 not following policies enforced by the multicast policy module 145.

In some embodiments, the multicast policy module 145 facilitates a method of sending Internet Protocol datagrams to a group of interested receivers as a single transmission for streaming media and other applications over the Internet, private networks, or any type of data network. The shared program 155 is an example of an application that is transmitted among a plurality of devices and presented to an end-user via interface 150. Multicast protocols, as facilitated by the multicast policy module 145, include Internet Group Management Protocol (IGMP), Protocol Independent Multicast (PIM), and Multicast VLAN Registration.

In some embodiments, a policy manager and a multicast protocol (which are not depicted in FIG. 1) reside within at least one of devices 125A-C. In other embodiments, a policy manager and a multicast protocol reside outside of devices 125A-C in a source device (S) not explicitly depicted in FIG. 1. Data packets associated with requests for multicast transmission are sent to host devices (H) from source devices (S). The policy manager and multicast protocol are connected to the switch 160, while obtaining attributes directly from the wireless controllers (e.g., WC 130A-C). Multicast transmissions are often employed in Internet Protocol (IP) applications of streaming media. More specifically, Internet Group Management Protocol (IGMP) is an IP used to establish access to resources for enabling multicast transmissions. Devices 125A-C are each a shared device within a group of devices (G), as described above. Each of the shared devices can be a host device (H) or a source device (S) that receives or sends a multicast transmission, respectively. For example, devices 125B and 125C are connected to the wired switch 160, and in turn the attributes are directly mapped to the multicast policy module 145. The attributes directly mapped to the multicast policy module 145 are used to authenticate a host device (H), as per permissions and priorities dictated by the source device (S) and sharing policies.

In embodiments, network configuration 100 incorporates the multicast policy module 145, which facilitates communication between the source devices (S) and host devices (H), among devices 125A-C, while applying policies and protocols. The query response mechanism, as implemented by the multicast policy module 145, allows the wired switch 160 to query WC 130B and 130C for sharable attributes compatible with sharing policies regarding devices 125B and C connected to APs 135B and C, respectively. The sharable attributes are directly mapped to the multicast policy module 145 and leveraged to prevent unauthorized access to multicast transmissions, which are run in the switch 160.

In some embodiments, the multicast policy module 145 aligns wired infrastructure and the wireless infrastructure. The information of the shared attributes of devices 125B and 125C is already computed and stored in a network solution in WC 130B and WC 130C, respectively, and directly mapped to the multicast policy module 145. Thus, the information in the shared attributes does not need to be recomputed, and leads to a more homogenous end-user experience, as outputted to user interface 150.

In some embodiments, the multicast policy module 145 removes unnecessary data packet flow in a network. The unnecessary data packet is digitally halted at the edge of AP 135B and AP 135C or switched directly. The processing efficiency of the network is increased by incorporating the multicast policy module 145, by further processing only necessary data packets and dropping the unnecessary data packets. As stated above, the unnecessary data packets are digitally halted in AP 135B and AP 135 and not processed any further by the multicast policy module 145. In turn, less computing resources are consumed when running a multicast protocol or applying policies on the wireless controllers.

In some embodiments, the multicast policy module 145 exchanges information between wired infrastructure to wireless infrastructure more efficiently. By mapping attributes directly to the multicast policy module 145 from a wireless controller, the coding structures in the wired and wireless infrastructures are modified. These modifications to the coding structures may create an information plane that facilitates more conducive overlap between devices and networks. The more conducive overlap increases the efficiency of information transfer.

Switch 160 contains a router which forwards data packets between computer networks, wherein the data packets are a formatted unit of data carried by a packet-switched network between computer networks, e.g., between a network having network configuration 100 and another network (which is not explicitly shown in FIG. 1). A packet includes control information and user data (e.g., source and destination network addresses, error detection codes, and sequencing information) that allows the packet payload to be delivered. Typically, control information is found in packet headers and trailers. The router may include a firewall, VPN handling, and other security functions. Switch 160 is included as one example of a point of access to the network established for wired client devices, which may be devices 125A-C. Devices 125A-C may connect to the switch 160 and through the switch 160, may be able to access other devices (not depicted in FIG. 1) within the network configuration 100.

The access points (AP) 135A-C are networking hardware devices which allow WiFi-compatible devices to connect to a wired network. The AP 135A handles the configuration of the wireless controller (WC) 130A; the AP 135B handles the configuration of the WC 130B; and the WAP 135C handles the configuration of the WC 130C.

Each of WC 130A-C has the following features: (i) interference detection and avoidance by adjusting radio frequency (RF) power and channel assignment; (ii) load balancing to connect an end-user to multiple access points for better coverage and data rates; and (iii) coverage hole detection and correction to protect against cell overlapping. Additionally, the AP 135A connects to the device 125A; the AP 135B connects to the device 125B; and the AP 135C connects to the device 125C. APs 135A-C are included as another example of a point of wireless access to the network established for devices 125A-C. Each of APs 135A-C may be a combination of hardware, software, and/or firmware that is configured to provide wireless network connectivity to devices 125A-C. In the illustrated example, APs 135A-C can be managed and configured by the WCs 130-C, respectively. APs 135A-C communicate with the WCs 130A-C and network 140, through wired or wireless interfaces.

The wireless controllers (e.g., WCs 130A-C) may manage network devices at a local site, or manage network devices at remote sites. WCs 130A-C may configure and/or manage switches, routers, access points (e.g., APs 135A-C), and/or devices connected to the network 140. The WCs 130A-C may provide the functionality of an access point (e.g., AP 135A-C). Attributes reside within the wireless controllers, wherein the attributes are directly mapped to the multicast policy module 145. While the WCs 130A-C are depicted as single units which may communicate with network 140, the WCs 130A-C may be constructed as multiple units and/or communications points with network 140.

WCs 130A-C may be in communication with the witch 160 and/or the APs 135A-C. Switch 160 and APs 135A-C provide network connectivity to various client devices, for example devices 125A-C. Using a connection to the switch 160 or the APs 135A-C, devices 125A-C may access network resources, including other devices connected to the network 120 (not depicted) and the network 120.

The devices 125A-C include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, and the like.

The network 140 may be a public network, such as the Internet. A public network is a network that may be shared by any number of entities, including the illustrated network configuration 100. A public network may have unrestricted access, such that any user may connect to it. The network 140 may include third-party telecommunication lines, such as phone lines, broadcast coaxial cable, fiber optic cables, satellite communications, cellular communications, and the like. The network 140 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 140 may include various content servers (which are not shown in FIG. 1). The content servers may include various providers of multimedia downloadable and/or streaming content, including audio, video, graphical, and/or text content, or any combination thereof. Examples of the content servers include web servers, streaming radio and video providers, and cable and satellite television providers. The devices 125A-C may request and access the multimedia content provided by the content servers.

Figure 2:
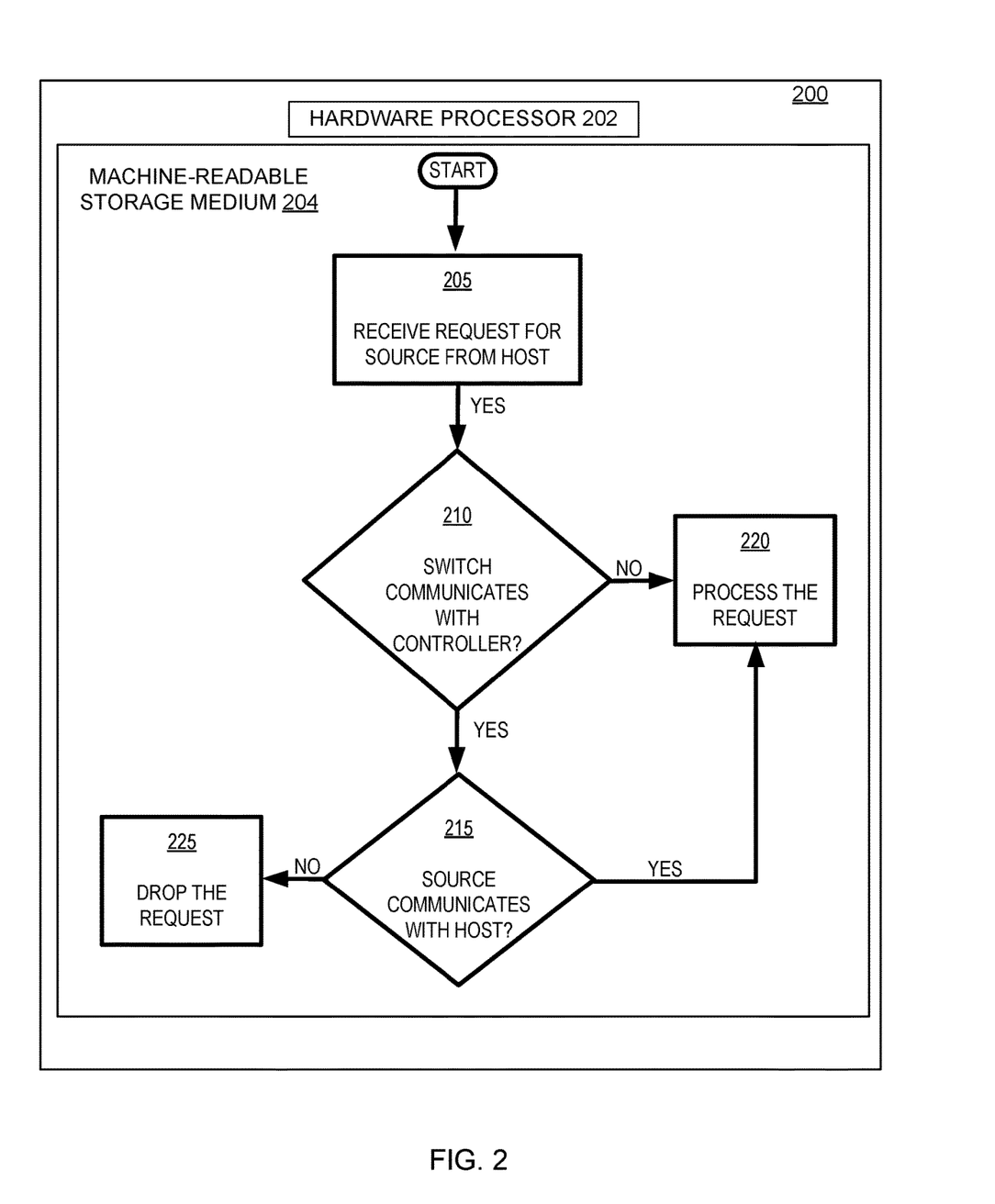
FIG. 2 is a block diagram illustrating an example of sharing attributes from a wireless controller, in accordance with various embodiments.

FIG. 2 is a block diagram illustrating example operations/instructions that may be executed to share attributes from a wireless controller. In the example implementation of FIG. 2, the computing component 200 includes a hardware processor, 202, and machine-readable storage medium, 204. In some embodiments, computing component 200 may be an embodiment of a wireless controller (WCs 130A-C), access point (AP 135A-C), or component of network 140 of FIG. 1, for example. More particularly, computing component 200 may be a component of a central entity such as wireless mobility controller in the network.

Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, as operations 205; 210; 215; 220; and 225, to share attributes from a wireless controller. The shared attributed from a wireless controller are used to drop unwanted multicast traffic request and streams, based on permissions of a host device (H) to access a source device (S). As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 202 may be a non-transitory storage medium, where the term "non-transitory" does not encompass transitory propagating signals. As described in detail below, machine-readable storage medium 202 may be encoded with executable instructions, for example, operations 205; 210; 215; 220; and 225, for client device grouping (e.g., establishing a group of devices (G)).

In some embodiments, switches (e.g., switch 160) run a multicast protocol that sets forth a process for querying the wireless controllers (e.g., WCs 130A-C) to determine the sharing attributes of the device (e.g., devices 125A-C). The information obtained regarding the attributes are used to drop unauthorized multicast traffic requests and streams. If the request is not authorized, then the associated data packet with the request is dropped. In turn, the multicast transmission is not allowed to go out. Based the shared attributes and policies applied by the multicast policy module 145, access to a multicast stream is limited to host devices (H) granted permission by the source device (S) within a group of devices (G).

At operation 205, the multicast policy module 145 invokes hardware processor 202 to receive a request for a source device (S) from a host device (H). As stated above, the multicast policy module 145 controls the wireless controllers (e.g., WCs 130A-C.) The software in the switch 160 is where the multicast protocol is run. The switch 160 attempts to communicate with wireless controllers (e.g., WC 130A-C). In embodiments, the sharing group of devices (G) further dictates which host devices (H) may access resources for a multicast transmission, based on the policies applied by CPPM or based on the location attribute of a shared device.

At operation 210, the multicast policy module 145 invokes hardware processor to determine whether the switch communicates with the controllers. The switch 160 must be able to establish a communicative connection with wireless controllers (e.g., WC 130A-C) to eventually drop unnecessary data packet flow. As described above, the WC 130A does not have a direct connection to the switch 160, whereas the WC 130B and 130C have a direct connection to the switch 160. The direct connection to the switch 160 allows the multicast policy module 145 to directly map an attribute from the WC 130B and the WC 130C.

In some instances, a data packet associated with the request, despite the switch 160 not communicating with the wireless controllers, is processed at operation 220. Thus, these data packets may not contain attribute information or other information that prevent unauthorized access for host devices (H) to source devices (S) for multicast transmissions. Stated another way, the data packet is consuming computing resources in instances where the switch 160 cannot communicate with the WC 130A-C and thus cannot provide optimal multicast transmissions. Upon the multicast policy module 145 determining the switch communicates with the wireless controllers, the multicast policy module 145 proceeds to operation 215.

In operation 215, the multicast policy module 145 invokes hardware processors 202 to determine whether the source device (S) communicates with the host device (H). In embodiments, the multicast policy module 145 determines whether the data from the source device (S) and a host device (H) receiving the data are in the same sharing group of devices (G), based on the query-response mechanism and data/information within the wireless controllers. The query-response mechanism examines the WC 130B and WC 130 C for sharable attributes. In instances where devices are within the sharing group of devices (G), the multicast policy module 145 invokes a multicast protocol in the switch 160 to further examine the source device (S) for specific information or data contained within the sharable attributes and/or associated with the source device (S).

In some instances, a data packet associated with the request, where the switch 160 communicates with the wireless controllers, is processed when executing operation 220 from operation 215. The data packet is associated with instances where the source device (S) and the host device (H) communicate with each other, while containing attributes that providing sharing and location information. When data packet is processed along the "YES" branch from operation 215 to operation 220, only necessary packets are processed. In contrast, the "NO" branch from operation 210 to operation 220 is also processing unnecessary data packets. In some instances, a data packet associated with the request, where the source devices (S) do not communicate with the host devices (H), is processed when executing operation 225 from operation 215. The multicast policy module 145 filters out devices not authorized to access resources enabling the multicast transmission from the source device (S). In turn, the multicast policy module 145 drops the data packets associated with the request from the filtered-out devices. Further processing of the data packet with the request is not done by the multicast policy module 145 or the hardware processor 202.

In embodiments, policies are applied with OVSDB APPCTL (Unix Ctl) commands to configure policies for IGMP and integrate the policies for IGMP with the multicast solution, in the absence of controller connectivity with the Halon Switches. In embodiments, the multicast policy module 145 leads to different AppCTL commands that drops data flow packets not required or able to share attributes built on Halon switches (e.g., the switch 160). The actual data associated with the AppCTL commands from the attributes in the wireless controllers. The multicast policy module 145 applies an algorithm which configures a policy; associates the policy; and disassociates the policy.

The command for configuring a policy is referred to as Command 1. ovs-appctl-t hpe-mgmdd confPolicy <policy_id> <group> <list_of_sources> (1)

The command for associating a policy is referred to as Command 2. ovs-appctl-t hpe-mgmdd associatePolicy <policy_id> <vlan_id> (2)

The command for disassociating a policy is referred to as Command 3. ovs-appctl-t hpe-mgmdd dissociate Policy 1 (3)

Figure 3:
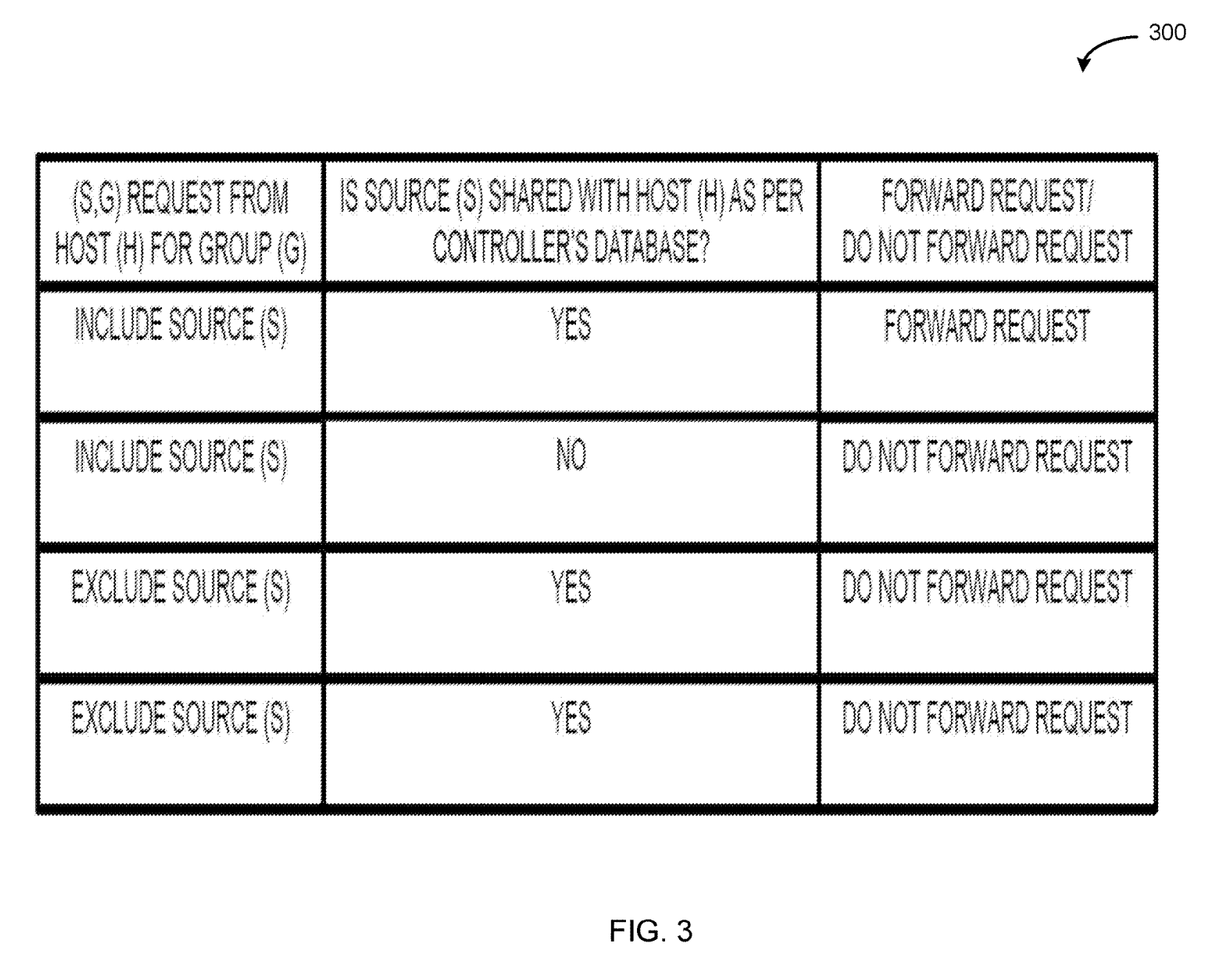
FIG. 3 is a table summarizing combinations for Internet Group Management Protocol (IGMP) requests with CPPM, in accordance with various embodiments.

FIG. 3 is a table summarizing combinations for Internet Group Management Protocol (IGMP) requests with CPPM, in accordance with various embodiments. Table 300 is a simplified case where the source device (S) is specified in a IGMP request from which data is extended or blocked in an include or exclude list, respectively. The (S,G) request in table 300 is a combination of multicast protocols for the source device (S) and devices within the group of devices (G). The multicast policy module 145 processes the IGMP request to determine whether to: (i) include or exclude the source device (S); (ii) share or not share the source device (S) with the host device (H) as per a controller database (DB); and (iii) forward or not forward the request.

In embodiments, there are non-conflicting scenarios where: (i) data packets associated with the request are forwarded by the multicast policy module 145 upon including the source device (S) is shared with the host device (H) as per the controller database; and (ii) data packets associated with the request are not forwarded by the multicast policy module 145 upon excluding the source device (S) not shared with the host device (H) as per the controller database.

In embodiments, there are conflicting scenarios where the source device (S) is to be included in a IGMP request and the source device (S) is not shared with host device (H). The multicast protocol module 145 honors the sharing attribute of the host device (H) by: (i) excluding the source device (S); and (ii) not forwarding the data packet associated with the request.

In embodiments, there are conflicting scenarios where the source device (S) is to be excluded in a IGMP request and the host device (H) is not be shared. The multicast protocol module 145 honors the sharing attribute of the device by excluding the source (S) and not forwarding the data packet associated with the request. The source device (S) is considered as excluded, as the host device (H) does not want data from the source device (S).

IGMP V3 request in table 300 is applicable for shared devices, where each of the shared device may see a list of the devices it can access. For example, an iPad®/iPhone® can see the Apple® devices to which the iPad®/iPhone® have access to. In embodiments, the devices running IGMP can only send request(s) with those specific source devices (S), and allowing attributes to be directly mapped in the multicast policy module 145. Thus, a switch (e.g., the switch 160) is not needed to map the attributes to the multicast policy module 145.

Figure 4:
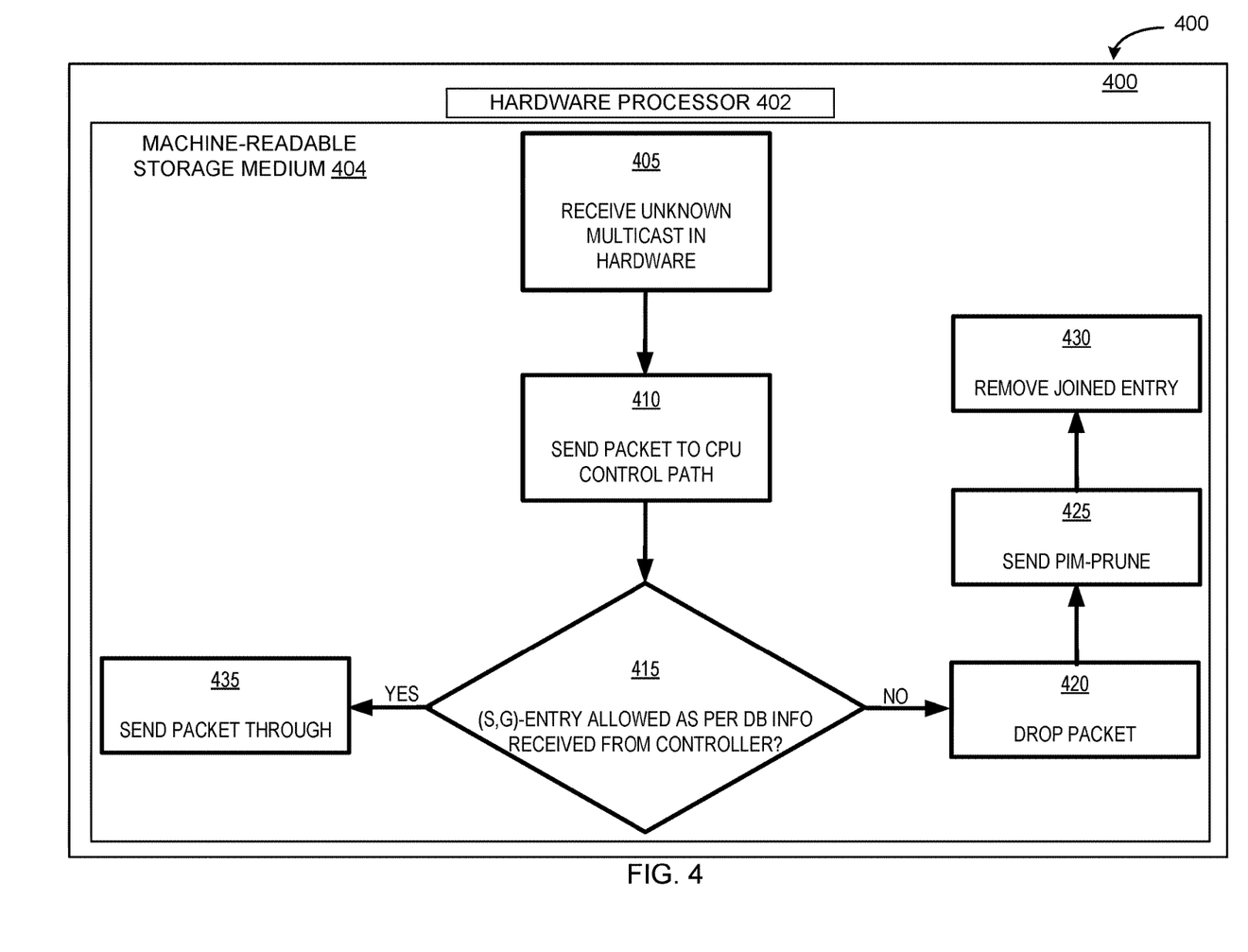
FIG. 4 is a block diagram illustrating an example of a computing component applying an algorithm for IGMP with controller data, in accordance with various embodiments.

FIG. 4 is a block diagram of a computing component applying an algorithm for IGMP with controller data. The operational steps in computing component 400 are performed by the multicast policy module 145 incorporated into a network, as machine-readable storage medium 404. Computing component 400, hardware processor 402, and machine readable storage medium 404, as depicted in FIG. 4, may be the same or similar to FIG. 2.

In instances where the information of the source device (S) is not known an IGMP router and IGMP V2 joins as a request (i.e., a JOIN request) for a group of devices (G), a filter within the IGMP router cannot process a joining request (i.e., a JOIN request). In turn, the multicast policy module 145 invokes an algorithm to address the JOIN request, using the instructions executed by machine-readable storage medium 404 for performing operations 405, 410, 415, 420, 425, 430, and 435. The algorithm in FIG. 4 is one example of dropping or sending data packets associated with a JOIN request.

At operation 405, the multicast policy module 145 invokes hardware processor 402 to receive an unknown multicast (and the accompanying JOIN request) in the hardware of a host device (H).

At operation 410, the multicast policy module 145 invokes hardware processor 402 to send data packets associated with the JOIN request to the CPU control path.

At operation 415, the multicast policy module 145 invokes hardware processor 402 to determine whether the source device (S) among the group of devices (G) in an (S,G)-entry is allowed, as per database information received from the wireless controllers. More specifically, the multicast policy module 145 ascertains whether an attribute is directly mapped and the information contained within the attribute allows a device making the JOIN request within the group of devices (G) to access a multicast transmission from a source device (S).

At operation 435, the multicast policy module 145 invokes hardware processor 402 to send the (data) packet associated with the request through when attributes are mapped directly from the wireless controllers and (S,G)-entry is allowed as per database (DB) info received from the wireless controllers (WCs 130B and C).

At operation 420, the multicast policy module 145 invokes hardware processor 402 to drop the (data) packet associated with request when a (S,G)-entry is not allowed as per database (DB) info received from the wireless controllers (WCs 130B and C).

At operation 425, the multicast policy module 145 invokes hardware processor 402 to send PIM-Prune to an upstream router when a (S,G)-entry is not allowed as per database (DB) info received from the wireless controllers (WCs 130B and C).

At operation 430, the multicast policy module 145 invokes hardware processor 402 to remove the JOINED entry (S,G)-entry not allowed as per database (DB) info received from the wireless controllers (WCs 130B and C).

Figure 5:
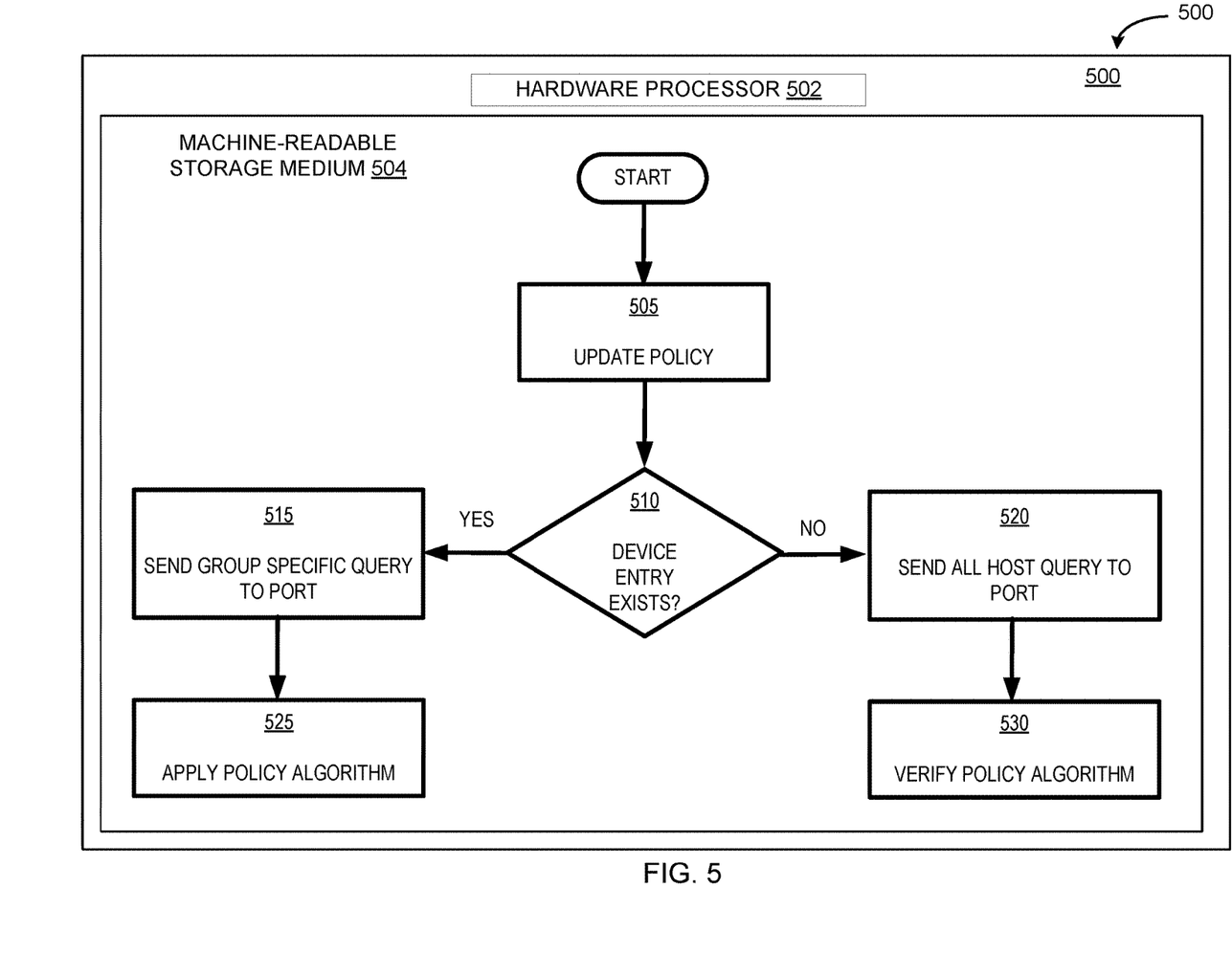
FIG. 5 is a block diagram illustrating an example of a computing component updating a policy from the controller, in accordance with various embodiments.

FIG. 5 is a flowchart illustrating the steps of updating a policy from the controller. The multicast policy module 145 performs the operations of computing component 500. The operational steps in computing component 500 are performed by the multicast policy module 145 incorporated into a network, as machine-readable storage medium 504. Computing component 500, hardware processor 502, and machine readable storage medium 504, as depicted in FIG. 5, may be the same or similar to FIG. 2.

At operation 505, the multicast policy module 145 invokes hardware processor 502 to update a policy (e.g., CPPM), based on the mapped attributes obtained directly from the wireless controllers. Upon updating the policy, the multicast policy module 145 determines whether an entry exists in a database listing the (S,G) entries (see FIG. 4). If the multicast policy module 145 determines the device entry exists among the (S,G) entries, then operations 515 and 525 are performed. If the multicast policy module 145 determines the device entry does not exist among the (S,G) entries, then operations 520 and 530 are performed.

At operation 515, the multicast policy module 145 invokes hardware processor 502 to send a group specific query (i.e., a query mechanism implemented on the group of devices (G)) to a port, wherein the port is the physical access point where the multicast data is received. Once this response is learned by the multicast policy module 145, the multicast policy module 145 invokes hardware processor 502 to apply the policy algorithm again, for example on the wireless controllers, in operation 525. Fewer resources have been used by directly mapping the attributes from the wireless controllers and analyzing the information contained within the mapped attributes. Only data packets associated with requests for multicast transmissions from authorized devices are processed. Thus, the processing efficiency of data packets is increased in comparison to instances where attributes are not directly mapped from the wireless controllers.

At operation 520, the multicast policy module 145 invokes hardware processor 502 to send an all host query (i.e., a query mechanism implemented on the host devices (H)) to a port, wherein the port is the physical access point where the multicast data is received. Once all responses are received by the multicast policy module 145, multicast policy module 145 is verifies the policy algorithm, for example limiting access to only authorized devices, in operation 530. Thus, unauthorized access to devices is limited or eliminated based on the information contained with the mapped attributes.

Furthermore, the multicast policy module 145 allows for the following improvements to Aruba Wireless programs: (i) aligning wired infrastructure to wireless infrastructure; (ii) removing unnecessary data packet flow in a network; (iii) exchanging information between wired infrastructure to wireless infrastructure more efficiently; and (iv) providing a data networking solution within a single device, as opposed a mix and match of devices, for example integrating Aruba AirGroup™ with general multicast traffic.

Figure 6:
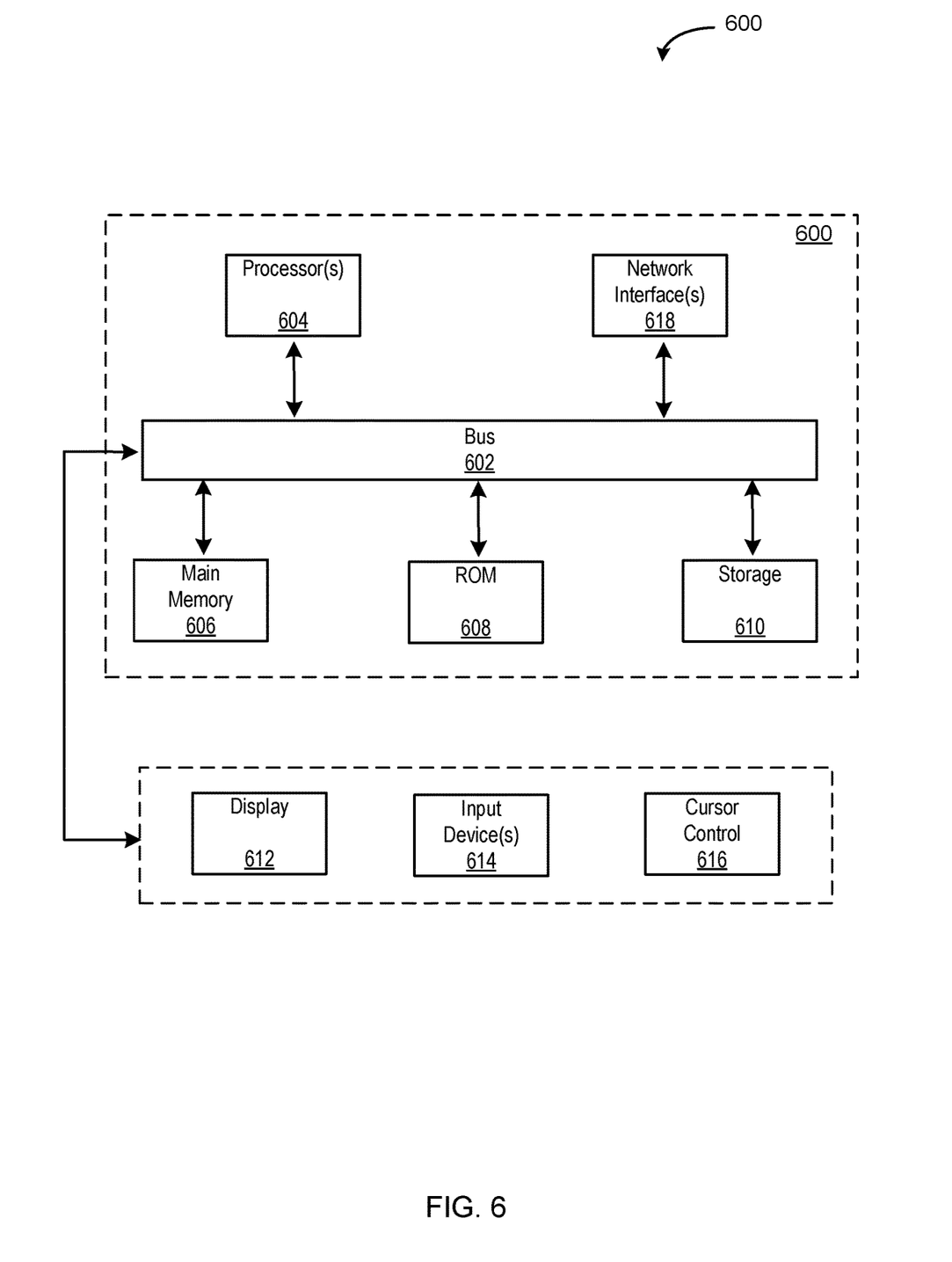
FIG. 6 is an example of a computing component that can be used in conjunction with various embodiments of the present disclosure.

FIG. 6 depicts a block diagram of an example computer system 600 in which various of the embodiments described herein may be implemented. For example, computer system 600 may represent computing or processing capabilities found within desktop, laptop, and notebook computers; hand-held computing devices (smart phones, cell phones, palmtops, tablets, etc.); mainframes, supercomputers, workstations, servers; or any other type of special-purpose or general-purpose computing devices as may be desirable or appropriate for a given application or environment.

Computing system 600 may also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated service digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic, or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network, and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
accessing at least one attribute associated with a wireless controller (WC) in a network based on a sharing policy;
sharing resources between a source device and a host device based on the at least one attribute;
determining, for a multicast protocol, a forwarding policy that complies with the sharing policy;
distinguishing, based on the forwarding policy, a first set of data packets necessary for multicast communication between the source device and the host device from a second set of data packets unnecessary for the multicast communication between the source device and the host device, wherein the first and second sets of data packets are forwarded in the network based on the multicast protocol, and wherein the second set of data packets are unauthorized to reach the host device based on the sharing policy; and
removing the second set of data packets prior to reaching the host device.

2. The method of claim 1, further comprising accessing the at least one attribute by:
receiving a request to the source device from the host device, wherein the request includes packets that allow the host device to access the source device; and
determining whether a switch coupled to the WC communicates with the WC.

3. The method of claim 2, wherein determining whether the switch communicates with the WC; comprises:
determining whether the source device communicates with the host device in response to determining that the switch communicates with the WC.

4. The method of claim 2, further comprises:
processing the request in response to determining that the switch does not communicate with the WC.

5. The method of claim 3, wherein determining whether the source device communicates with the host device comprises:
processing a second request from the source device to the host device in response to determining that the source device communicates with the host device;
dropping the second request in response to determining that the source device does not communicate with the host device; and
wherein the second request includes packets that allow the host device to access the source device.

6. The method of claim 5, wherein dropping the second request comprises:
halting the packets that allow the host device to access the source device at an edge of an access point connected with a WC.

7. The method of claim 1, further comprising:
sending a multicast stream associated with the at least one attribute to a user interface;
aligning the wireless controller with a switch coupled to the WC; and
exchanging the multicast stream between devices connected to the WC.

8. The method of claim 1, further comprises:
applying one or more commands in an algorithm for processing a request; and
exchanging the algorithm between the WC and a switch coupled to the WC.

9. The method of claim 8, wherein the one or more commands comprises:
a first command to configure a policy;
a second command to associate the policy to an interface; and
a third command to disassociate the policy from the interface.

10. A method, comprising:
determining a forwarding policy for a multicast protocol operating on a switch, which is coupled to a plurality of wireless controllers, wherein the forwarding policy indicates which data packets are authorized to be forwarded via the plurality of wireless controllers;
determining whether at least one device entry associated with the plurality of wireless controller exists;
exporting attributes from the plurality of wireless controllers in response to determining the at least one device entry exists; and
limiting access to a multicast stream associated with the multicast protocol based on the forwarding policy applied to the exported attributes.

11. The method of claim 10, further comprises:
sending a group specific query to a port in response to determining that the at least one device entry associated with the plurality of wireless controllers exists.

12. The method of claim 10, further comprises:
sending an all-host query to a port in response to determining that the at least one device entry associated with the plurality of wireless controllers does not exist.

13. A non-transitory computer-readable storage medium storing instructions that when executed by a computer cause the computer to perform a method, the method comprising:
accessing at least one attribute associated with a wireless controller (WC) in a network based on a sharing policy;
sharing resources between a source device and a host device based on the at least one attribute;
determining, for a multicast protocol, a forwarding policy that complies with the sharing policy;
distinguishing, based on the forwarding policy, a first set of data packets necessary for multicast communication between the source device and the host device from a second set of data packets unnecessary for the multicast communication between the source device and the host device, wherein the first and second sets of data packets are forwarded in the network based on the multicast protocol, and wherein the second set of data packets are unauthorized to reach the host device based on the sharing policy; and
removing the second set of data packets prior to reaching the host device.

14. The non-transitory computer-readable storage medium of claim 13, wherein the method further comprises accessing the at least one attribute by:
receiving a request to the source device from the host device, wherein the request includes packets that allow the host device to access the source device; and
determining whether a switch coupled to the WC communicates with the WC.

15. The non-transitory computer-readable storage medium of claim 14, wherein determining whether the switch communicates with the WC, comprises:
determining whether the source device communicates with the host device in response to determining that the switch communicates with the WC.

16. The non-transitory computer-readable storage medium of claim 14, wherein the method further comprises:
processing the request; in response to determining that the switch does not communicate with the WC.

17. The non-transitory computer-readable storage medium of claim 15, wherein determining whether the source device communicates with the host device comprises:
processing a second request from the source device to the host device in response to determining that the source device communicates with the host device;
dropping the second request in response to determining that the source device does not communicate with the host device; and
wherein the second request includes packets that allow the host device to access the source device.

18. The non-transitory computer-readable storage medium of claim 17, wherein dropping the second request comprises:
halting the packets that allow the host device to access the source device at an edge of an access point connected with a WC.

19. The non-transitory computer-readable storage medium of claim 13, wherein method further comprises:
sending a multicast stream associated with the at least one attribute to a user interface;
aligning the wireless controller with a switch coupled to the WC; and
exchanging the multicast stream between devices connected to the WC.

20. The non-transitory computer-readable storage medium of claim 13, wherein the method further comprises:
applying one or more commands in an algorithm for processing a request; and
exchanging the algorithm between the WC and a switch coupled to the WC.

\* \* \* \* \*